United States Patent [19]

Doddapaneni et al.

[11] Patent Number: 5,882,621
[45] Date of Patent: Mar. 16, 1999

[54] METHOD OF PREPARATION OF CARBON MATERIALS FOR USE AS ELECTRODES IN RECHARGEABLE BATTERIES

[75] Inventors: Narayan Doddapaneni, Alburquerque, N. Mex.; James C. F. Wang, Livermore; Robert W. Crocker, Fremont, both of Calif.; David Ingersoll, Alburquerque, N. Mex.; David W. Firsich, Dayton, Ohio

[73] Assignee: Sandia Corporation, Albuquerque, N. Mex.

[21] Appl. No.: 853,971

[22] Filed: May 9, 1997

Related U.S. Application Data

[63] Continuation of Ser. No. 568,844, Dec. 7, 1995, abandoned.

[51] Int. Cl.⁶ .................................................. H01M 4/04
[52] U.S. Cl. .................................. 423/445 R; 264/29.7; 423/447.6; 429/218
[58] Field of Search ................... 264/29.7; 423/445 R, 423/447.6; 429/218

[56] References Cited

U.S. PATENT DOCUMENTS

| | | | |
|---|---|---|---|
| 3,961,025 | 6/1976 | Harendza-Harinxma | 423/445 R |
| 4,668,595 | 5/1987 | Yoshino et al. | 429/194 |
| 4,702,977 | 10/1987 | Hiratsuka et al. | 429/194 |
| 4,725,422 | 2/1988 | Miyahayashi et al. | 423/445 R |
| 4,749,514 | 6/1988 | Murakami et al. | 252/500 |
| 4,832,881 | 5/1989 | Arnold, Jr. et al. | 264/29.7 |
| 4,863,814 | 9/1989 | Mohri et al. | 429/60 |
| 4,863,818 | 9/1989 | Yoshimoto et al. | 429/218 |
| 4,959,281 | 9/1990 | Nishi et al. | 429/194 |
| 4,968,527 | 11/1990 | Yoshimoto et al. | 427/122 |
| 5,093,216 | 3/1992 | Azuma et al. | 429/218 |
| 5,208,003 | 5/1993 | Simandl et al. | 423/445 R |
| 5,358,802 | 10/1994 | Mayer et al. | 429/218 |

*Primary Examiner*—Gary P. Straub
*Assistant Examiner*—Stuart L. Hendrickson
*Attorney, Agent, or Firm*—Timothy D. Stanley

[57] ABSTRACT

A method of producing carbon materials for use as electrodes in rechargeable batteries. Electrodes prepared from these carbon materials exhibit intercalation efficiencies of ≈80% for lithium, low irreversible loss of lithium, long cycle life, are capable of sustaining a high rates of discharge and are cheap and easy to manufacture. The method comprises a novel two-step stabilization process in which polymeric precursor materials are stabilized by first heating in an inert atmosphere and subsequently heating in air. During the stabilization process, the polymeric precursor material can be agitated to reduce particle fusion and promote mass transfer of oxygen and water vapor. The stabilized, polymeric precursor materials can then be converted to a synthetic carbon, suitable for fabricating electrodes for use in rechargeable batteries, by heating to a high temperature in a flowing inert atmosphere.

16 Claims, 2 Drawing Sheets

METHOD OF PREPARATION OF CARBON MATERIALS FOR USE AS ELECTRODES IN RECHARGEABLE BATTERIES

This application is a continuation of application Ser. No. 08/568,844, filed Dec. 7, 1995, now abandoned.

STATEMENT OF GOVERNMENT INTEREST

The government has rights in this invention pursuant to contract no. DE-AC04-94AL8500 between the U.S. Department of Energy and Sandia Corporation.

BACKGROUND OF THE INVENTION

The present invention relates generally to the preparation of carbon materials for use as electrodes in rechargeable batteries and more particularly to methods of treating polymeric precursor powders and fibers and producing carbon materials for use as anode materials in rechargeable lithium batteries having improved performance.

A majority of the research aimed at development of rechargeable batteries that exhibit improved performance characteristics, such as increased cycle life and energy and power densities, has focused on the development of lithium rechargeable batteries because they provide significant advantages in performance characteristics when compared to other battery systems. Of particular interest, has been the development of lithium anodes for secondary battery applications.

Rechargeable lithium battery cells that utilize lithium metal as an anode material have not gained widespread use due to limitations in cell performance resulting from extensive dendrite formation leading to cell shorting and inefficient electrochemical deposition of lithium on charging, coupled with safety problems inherent in the use of lithium metal, which is highly reactive. As disclosed by Murakami et al. in U.S. Pat. No. 4,749,514, many of these problems can be overcome by incorporating lithium into a graphitic carbon structure. This process, known as intercalation, involves insertion of lithium metal atoms along the c-axis of graphite to form a charge transfer compound, wherein the lithium atom appears to donate an electron to the graphite/carbon host binding the lithium to the graphite/carbon host by electrostatic attraction. By incorporating lithium into a graphite/carbon host in this fashion the chemical reactivity of the lithium is reduced, overcoming problems associated with the use of metallic lithium.

Carbon in various physical forms (foams, powders, fibers) and states of aggregation (films, monolithic pieces, pressed powders/fibers) has been used for many years as an electrode material in batteries. The synthesis of carbonaceous materials for lithium intercalation anodes has been extensively described. These syntheses generally involve the controlled pyrolysis of an organic precursor material such as benzene (Mohri et al., U.S. Pat. No. 4,863,814; Yoshimoto et al., U.S. Pat. No. 4,863,818 and Yoshimoto et al., U.S. Pat. No. 4,968,527), selected furan resins (Nishi et al., U.S. Pat. No. 4,959,281), thin films of poly(phenylene oxadiazole) (Murakami et al., U.S. Pat. No. 4,749,514), various carbonizable organic compounds such as condensed polycyclic hydrocarbons and polycyclic hetrocyclic compounds, novalak resins and polyphenylene and poly(substituted) phenylenes (Miyabayashi et al., U.S. Pat. No. 4,725,422; Hirasuka et al., U.S. Pat. No. 4,702,977).

By way of example, Arnold et al., U.S. Pat. No. 4,832,881 and Simandl et al., U. S. Pat. No. 5,208,003, describe carbon materials in the form of foams, aerogels and microcellular carbons which are useful as anode materials for high energy density batteries. While these carbon materials represent an improvement over conventional carbon powder for use as anodes, they have several disadvantages. Methods used to prepare these carbon materials require elaborate processing steps to prepare their precursor materials; among other things, solvents used to prepare the precursor materials must be completely removed from the precursor materials prior to the carbonization step. In order not to disrupt the microstructure of the precursor material the solvent removal step must be done under carefully controlled conditions using, for example, freeze drying or supercritical extraction. Furthermore, the solvents must either be disposed of or purified if they are to be reused. In addition, before the carbonized product produced by these processes can be used, additional fabrication steps, such as machining, must be employed.

For the reasons set forth above, there has been a particular interest in developing carbon materials that will reversibly intercalate and deintercalate lithium. However, many of the carbon-based systems initially developed were not able to provide high cycle life due to limitations of the graphite/carbon electrode material, e.g., exfoliation during cycling and/or reaction with the solvent. Further work has led to development of carbon materials that are able to cycle well, and battery cells utilizing these materials are commercially available. However, these carbons are typically monolithic materials, having high surface areas, which limit their usefulness, particularly for secondary battery applications. Furthermore, they are difficult and expensive to manufacture.

In addition to new carbon electrode materials that are more compatible with lithium, there have been numerous efforts to improve the intercalation efficiency of carbon materials useful for lithium intercalation electrodes. One solution is described in Yoshino et al, in U.S. Pat. No. 4,668,595, wherein doping of a wide variety of carbons formed from carbon powders, carbon blacks and carbonized polymeric fibers is disclosed. Azuma et al., U.S. Pat. No. 5,093,216 disclose incorporation of phosphorous into carbonized materials to improve intercalation efficiency and Mayer et al., in U.S. Pat. No. 5,358,802, disclose doping carbon foams with dopants such as phosphorous, boron, arsenic and antimony to improve intercalation efficiency. However, these carbon materials showed poor cycle life and one problem that still remains to be overcome is the irreversible loss of lithium that takes place during initial cycling of these carbon material as an electrode in a battery environment. The irreversible losses of lithium from the carbon electrode materials can result in the loss of 30 to 60% of the initial battery capacity.

What is required is a carbon material that can be fabricated into electrodes for lithium secondary batteries that exhibits high intercalation efficiencies for lithium, low irreversible loss of lithium, long cycle life, is capable of sustaining a high rate of discharge and is cheap and easy to manufacture.

Responsive to these needs, novel processing methods have been developed for producing carbon materials for use as electrodes in rechargeable batteries. Polymeric precursor materials processed in accordance with the present invention can yield carbon materials for use as electrodes that exhibit high intercalation efficiencies and in which the irreversible loss of lithium can be reduced to a few percent of the initial capacity. Furthermore, the lengthy and involved extraction procedures for removing solvents can be eliminated thereby reducing the cost of producing the carbon material. In addition, carbon materials having higher densities can be obtained, thereby making it possible to achieve high energy density batteries. In particular, the present invention can improve the performance of alkali metal secondary batteries by the use of anodes prepared from treated polymeric precursor materials. Additionally, lithium intercalation electrodes prepared from polymeric precursor materials processed in accordance with the present invention exhibit minimal dendritic deposition, have long cycle life and are capable of sustaining the high rate of discharge required for high energy density secondary batteries. Electrodes prepared from such treated polymeric precursor materials can also retain a large fraction of their initial capacity.

SUMMARY OF THE INVENTION

The present invention provides methods for processing carbonizable polymeric precursor materials and producing carbon materials which can be used to produce electrodes for use in rechargeable batteries. In particular, a novel two-step stabilization process is described in which the polymeric precursor materials can be stabilized by first heating the polymeric precursor materials in an inert atmosphere and subsequently heating the product of the first heating step in air. During the stabilization steps, the polymeric precursor material can be agitated by tumbling the powder within a rotating container, or fluidized in a fluidized bed or by any other means of imparting relative motion to the particles to reduce particle fusion and enhance heat and mass transfer of water vapor and oxygen between the particles and the gas phase. The stabilized polymeric precursor material can then be converted to a synthetic carbon material, suitable for fabricating lithium intercalation electrodes, by heating to a high temperature in an inert atmosphere. Control of carbon particle morphology can also be achieved by the addition of inert pore formers, such as urea, prior to either the initial stabilization step or the carbonization step.

These and other features will become apparent to those skilled in the art from detailed disclosure of the present invention as described and claimed herein.

DETAILED DESCRIPTION OF THE INVENTION

Figure 1:
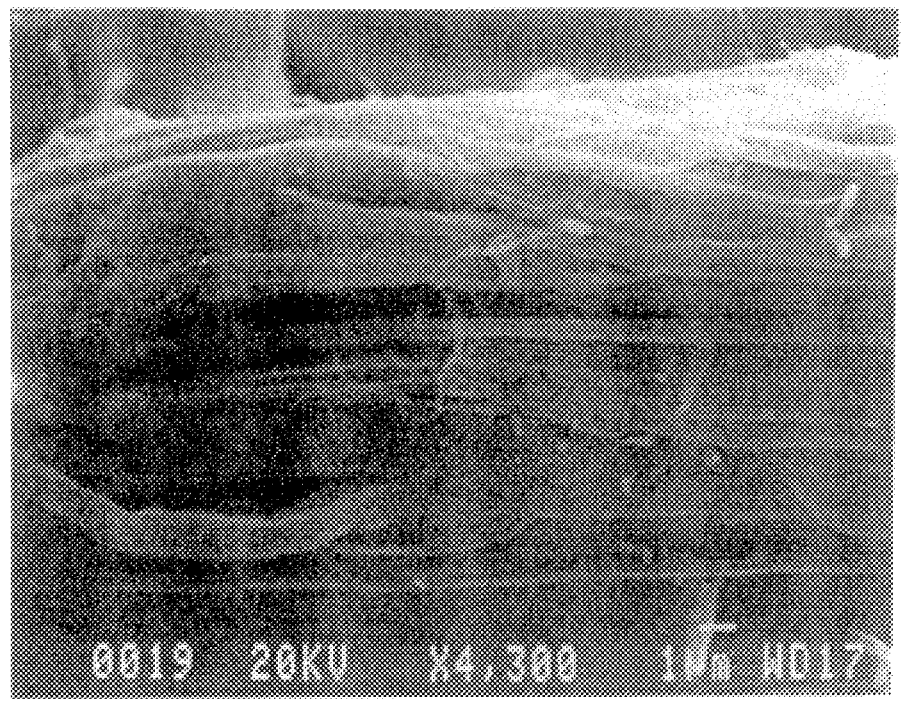
FIG. 1 shows a micrograph of a carbon fiber produced from a polymer fiber precursor by the process disclosed herein.

The present invention relates generally to methods for processing carbonizable polymeric precursor materials and producing carbon materials for use as electrodes in rechargeable batteries.

To better understand the present invention, the following introductory comments are provided. It has been recognized by the inventors that the final properties of carbon materials produced by thermal decomposition of polymeric precursor materials, such as polyacrylonitrile (PAN) and co-polymers of (PAN), are strongly determined by the pretreatment process that stabilizes the polymeric precursor material prior to carbonization. The need for pretreating ("preoxidizing" or "stabilizing") certain polymeric precursor materials prior to carbonization in order both to increase the carbon yield as well as ensure that the desired carbon structure is achieved is known. In order, for example, for PAN to pyrolyze it is necessary to crosslink or cyclize the polymeric precursor material prior to carbonization. As disclosed by Arnold, supra, this pretreatment has traditionally be done by slowly heating the precursor material in air to a temperature in the range of 150°–300° C. Without this pretreatment step, carbonization of the precursor material occurs with significant degradation of the polymeric material; low molecular weight fragments are formed in preference to carbon and the carbon yield is low.

The chemistry associated with the aforementioned pretreatment step has been extensively investigated. Although it is a complex system, it is generally accepted that PAN undergoes an intermolecular reaction that leads to fused, conjugated cyclic structures down the chain length (referred to as a "ladder polymer") and that this ladder polymer rapidly reacts with oxygen to form the final brown/black "preoxidized" or "stabilized" material. This pretreated material can be subsequently heated to temperatures in the range 500°–2500° C., in the presence of an inert gas, to form a final carbonized product. The overall pretreatment step is quite exothermic; without careful control of processing conditions the polymeric precursor material can become so hot that it may fuse, decompose or even burn. However, the inventors have found that by appropriate control of the pretreatment process, it is possible not only to produce carbon materials for use as electrodes in rechargeable batteries with improved and reproducible properties without the need for further processing but also to reduce significantly lot-to-lot variability in the produced carbon materials, thereby lowering costs.

The ability to tailor the morphology, i.e. surface area, particle shape and size, of the final carbon materials is also critical for various applications. For example, for capacitors, solid electrolyte batteries and high rate applications, in general, submicron sized carbon particles are required, whereas for lower rates of discharge and/or with liquid electrolytes, carbon particles having a diameter of about 30 $\mu$m are necessary in order to reduce self discharge. The inventors have discovered that carbon materials having low surface areas (<10 m<2>/g) are advantageous for reducing the irreversible loss of lithium.

More specifically, the instant invention is directed to a method of processing carbonizable, polymeric, precursor materials that can be subsequently pyrolyzed to produce carbon materials for use as lithium intercalation electrodes in rechargeable batteries. The process disclosed herein provides a novel two-step method for stabilizing polymeric precursor materials, such as polyacrolynitrile (PAN) and co-polymers of PAN with monomers including, but not limited to, itaconic acid, acrylic acid, methacrylic acid, vinyl acetate, styrene, divinyl benzene, vinyl chloride and vinylidene chloride, thereby improving the yield and quality of the carbon materials produced by carbonizing these stablized precursor materials. It will be appreciated that by first heating the precursor material to a range of about 150°

C. to about 250° C. in an inert atmosphere, preferably nitrogen, followed by a second heating step to a range of about 100° C. to about 250° C. in an oxygen containing atmosphere, preferably air, the methods of the instant invention provide a significant improvement over existing pretreatment processes for stabilizing carbonizable, polymeric precursor materials.

Figure 2:
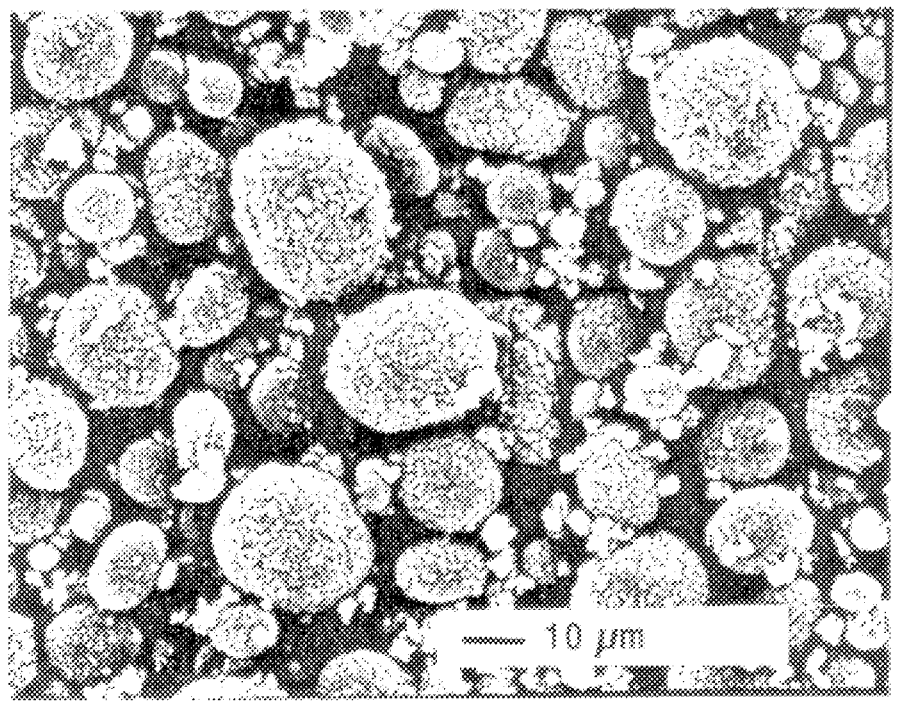
FIG. 2 shows a micrograph of carbon powder produced from a polymer powder precursor by the process disclosed herein.
Figure 3:
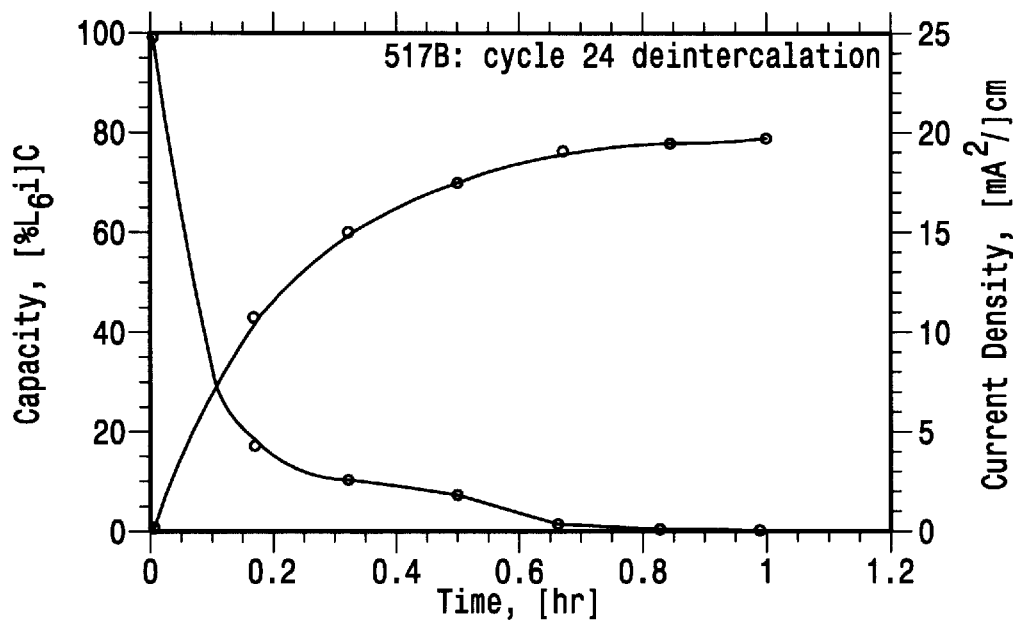
FIG. 3 show a discharge curve for a carbon anode made from carbon powder produced by the process disclosed herein. Also shown is the variation in battery capacity with time as a function of % $Li_6C$. The electrolyte was an anhydrous 1.0 molar solution of lithium hexafluoroarsenate in a 70:30 mixture of ethylene carbonate and diethylcarbonate.
Figure 4:
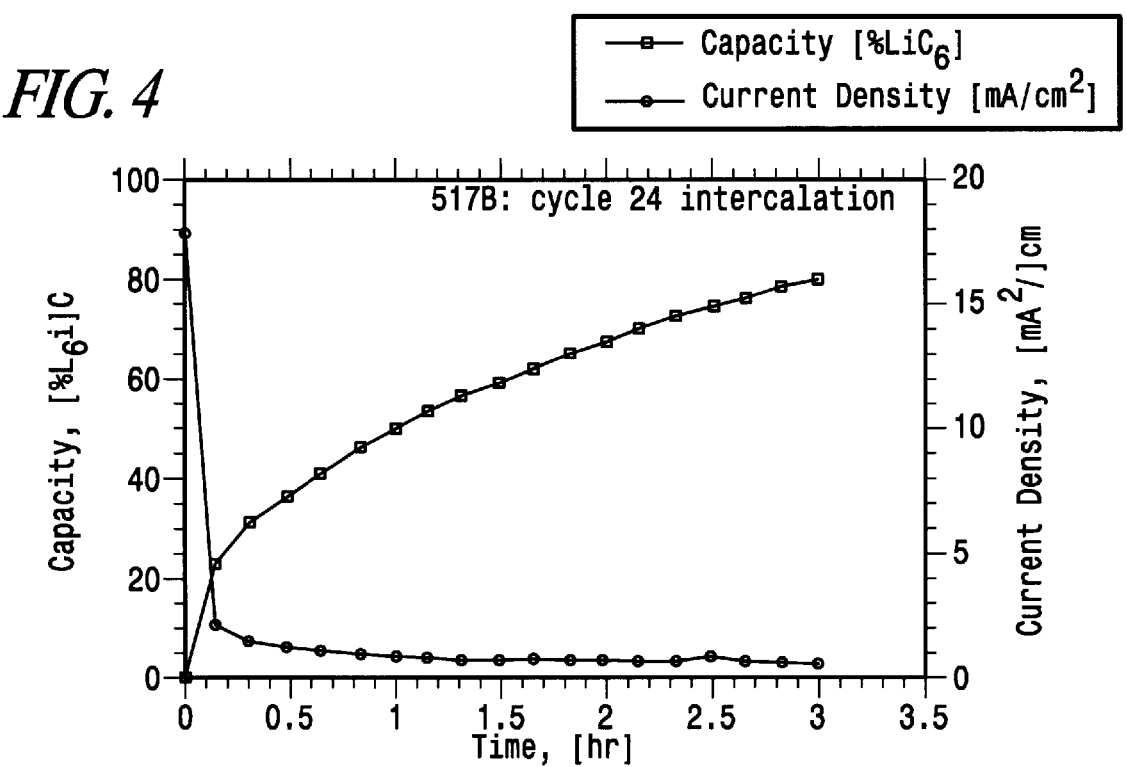
FIG. 4 shows a charge curve for incorporation of lithium into a carbon anode made from powder produced by the process disclosed herein. The electrolyte was an anhydrous 1.0 molar solution of lithium hexafluoroarsenate.

Examples of carbon materials, both powder and fiber, which are prepared from acrylonitrile based polymers, such as PAN and PAN co-polymers, by the method of the present invention are shown in FIGS. 1 and 2. They have microcrystalline structures consisting of randomly oriented domains shown by transmission electron microscopy to contain approximately 4 to 10 lattice planes extending approximately 20 to 50 Å in the lateral dimension. X-ray diffraction spectra show $d_{002}$ lattice spacing on the order of 3.5 to 3.7 Å and Raman spectra show peaks of near equal height at 1360 $cm^{-1}$ (disordered peak) and 1580 $cm^{-1}$ (ordered peak). Carbon materials when produced in accordance with the process of the present invention from PAN powder (having an average particle size of 35 $\mu$m), the BET surface area of the carbon material was approximately 5 $m^2/g$. Electrodes constructed from this carbon material are suited for use as the anode in lithium ion secondary batteries and are capable of utilizations in excess of 80%, based on $LiC_6$ as shown in FIGS. 3 and 4.

The product of the first heating step of the stabilization pretreatment procedure comprises a ladder polymer or PAN cyclic imine having a yellow to orange color and the following nominal elemental composition:

65.2% Carbon 5.14% Hydrogen

22% Nitrogen 6.9% Oxygen.

The product of the second heating step of the stabilization pretreatment procedure has the following nominal elemental composition:

60% Carbon 3.23% Hydrogen 21.6% Nitrogen

13% Oxygen.

These compositions are intended only to be indicative and neither limit nor define the process of this invention.

The material produced by the pretreatment program disclosed herein can be converted to a synthetic carbon by heating to a high temperature in a flowing inert atmosphere, preferably argon flowing at a rate of about 25 standard cubic ft/hr. The pretreated polymeric precursor material is placed in a container or crucible, preferably alumina, that will withstand the carbonization conditions. The following carbonization conditions can be used:

1) Place the crucible and its contents in a furnace and adjust the flow rate of an inert gas over the crucible;
2) Raise the temperature of the crucible and its contents at a rate of less than about 5° C./min from ambient to about 300° C.;
3) Maintain the temperature at about 300° C. for about 2 hours;
4) Raise the temperature of the furnace from about 300° C. to about 370° C. at a rate of less than about 5° C./min;
5) Maintain that temperature for about 5 hours;
6) Raise the temperature from about 370° C. to about 900° C. at a rate of less than about 5° C./min;
7) Maintain that temperature for about 6 hours;
8) Cool to ambient temperature.

The carbon powder resulting from this procedure can be characterized as having a radially symmetric branched fractal morphology similar to the original polymer precursor. It posses the following characteristics: Tap density: >0.95 g/cm3 Particle size distribution: 10 to 90 $\mu$m with a mean size of 30 $\mu$m Principal Raman peaks: 1300 to 1400 cm<−1> and 1550–1600 cm<−1> Ratio of principal Raman peaks: 3.2.

Analysis of the elemental composition showed the following (on a weight percent basis except for sulfur):

>90% carbon

<3–6% nitrogen

<1.5% oxygen

<0.5% hydrogen

<150 ppm sulfur.

By agitating the particle bed during the two-step stablization or pretreatment process, for example, tumbling the particle bed in a rotating container in a furnace or fluidized in a fluidized bed reactor, detrimental self-heating effects such as particle agglomeration and fusion can be mitigated. Agitating the particle bed further operates to enhance heat transfer and mass transfer of oxygen and water vapor between particles and the gas phase. This results in better process control and a more highly reproducible product. The carbon material produced from the agitation process exhibits high capacity and improved charge/discharge rates for lithium.

The present invention now will be described more fully hereinafter by way of various examples illustrative of the invention. This invention may, however, be embodied in many different forms and should not be construed as limited to the embodiment set forth herein.

The following examples illustrate the process of pretreatment of carbonizable, polymeric precursor materials.

EXAMPLE 1

1200 g of PAN powder was placed into a 12" diameter rotating drum which was mounted in the interior of a programmable oven. The drum was purged with nitrogen for about an hour and then heated according to the following cycle: from room temperature to about 175° C. at a rate of less than 100° C./hr, 175° C. to about 250° C. at a rate of less than 5° C./hr, hold at about 250° C. for about 6 hours. During the heating cycle the drum was rotated at approximately 10 rpm and a stream of nitrogen was directed into the drum to maintain the inert atmosphere. After cooling to room temperature, the nitrogen purge was exchanged for a flow of compressed air (approximately 275 ml/min) and the drum was again heated using the following cycle: room temperature to about 100° C. at a rate of less than 100° C./hr, 100° C. to about 250° C. at a rate of less than 10° C./hr, hold at about 250° C. for about 18 hours. As before, the drum was rotated during the heating cycle at about 10 rpm.

EXAMPLE 2

1200 g of PAN powder was placed into a 12" diameter rotating drum which was mounted in the interior of a programmable oven. The drum was purged with nitrogen for about an hour and then heated according to the following cycle: from room temperature to about 175° C. at a rate of less than 100° C./hr., 175° C. to about 250° C. at a rate of less than 5° C./hr, hold at about 250° C. for about 6 hours. During the heating cycle the drum was rotated at approximately 10 rpm and a stream of nitrogen was directed into the drum to maintain the inert atmosphere. After cooling to room temperature under the nitrogen purge, the contents of the drum were transferred into a drum of similar dimension made from porous graphite/carbon. This drum was mounted in a programmable oven. A stream of compressed air (approximately 275 ml/min) was directed into the drum and the drum was rotated at approximately 10 rpm while the following heat cycle was applied: room temperature to about 100° C. at a rate of 100° C./hr, 100° C. to about 250° C. at a rate of less than 10° C./hr, hold for about 8 hours at about 250° C.

The inventors have found that other carbonizable polymer, as described below, can be substituted for PAN and pretreated in the same manner as in the examples given above to produce a carbon powder having the desired properties.

EXAMPLE 3

A carbonizable polymer was pretreated in exactly the same manner as described in either Examples 1 or 2 except that polyacrolynitrile homopolymer was substituted for PAN.

EXAMPLE 4

A carbonizable polymer was pretreated in exactly the same manner as described in either Examples 1 or 2 except that polyacrolynitrile co-monomer of vinyl acetate (containing from 6–10 wt % vinyl acetate) was substituted for PAN.

EXAMPLE 5

A carbonizable polymer was pretreated in exactly the same manner as described in either Examples 1 or 2 except that a co-polymer of polyacrolynitrile and polymethylmethacrylate was substituted for PAN.

As illustrated in the next examples, pore formers, such as urea, can be mixed with the polymer precursor material prior to the pretreatment step or with the stabilized polymer precursor prior to the carbonization step in order to control particle morphology and size distribution.

EXAMPLE 6

1200 g of PAN powder and 600 g of urea was placed into a 12" diameter rotating drum which was mounted in the interior of a programmable oven. The drum was purged with nitrogen for about an hour and then heated according to the following cycle: from room temperature to about 175° C. at a rate of less than 100° C./hr., 175° C. to about 250° C. at a rate of less than 5° C./hr, hold at about 250° C. for about 6 hours. During the heating cycle the drum was rotated at approximately 10 rpm and a stream of nitrogen was directed into the drum to maintain the inert atmosphere. After cooling to room temperature, the nitrogen purge was exchanged for a flow of compressed air (approximately 275 ml/min) and the drum was again heated using the following cycle: room temperature to about 100° C. at a rate of less than 100° C./hr, 100° C. to about 250° C. at a rate of less than 10° C./hr, hold at about 250° C. for about 18 hours. As before, the drum was rotated during the heating cycle at about 10 rpm. The addition of urea to the PAN powder prior to the pretreatment process creates reduced particle size and an inert atmosphere.

EXAMPLE 7

1200 g of PAN powder and 600 g of urea was placed into a 12" diameter rotating drum which was mounted in the interior of a programmable oven. The drum was purged with nitrogen for an hour and then heated according to the following cycle: from room temperature to about 175° C. at a rate of less than 100° C./hr., 175° C. to about 250° C. at a rate of less than 5° C./hr, hold at about 250° C. for about 6 hours. During the heating cycle the drum was rotated at approximately 10 rpm and a stream of nitrogen was directed into the drum to maintain the inert atmosphere. After cooling to room temperature, the nitrogen purge was exchanged for a flow of compressed air (approximately 275 ml/min) and the drum was again heated using the following cycle: room temperature to about 100° C. at a rate of less than 100° C./hr, 100° C. to about 250° C. at a rate of less than 10° C./hr, hold at about 250° C. for about 18 hours. As before, the drum was rotated during the heating cycle at 10 rpm. The addition of urea creates reduced particle size and an inert atmosphere.

EXAMPLE 8

PAN powder was pretreated exactly as described in either of Examples 1 or 2. The stabilized PAN material was treated with an aqueous solution containing about 600 g of urea. This mixture was then dried and placed into a crucible, preferably alumina, that will withstand the carbonization conditions. The following carbonization conditions may be used:

1) Place the crucible an its contents in a furnace and adjust the flow rate of an inert gas over the crucible;
2) Raise the temperature of the crucible and its contents at a rate of less than 5° C./min from ambient to about 300° C.;
3) Maintain the temperature at about 300° C. for about 2 hours;
4) Raise the temperature of the furnace from about 300° C. to about 370° C. at a rate of less than 5° C./min;
5) Maintain that temperature for about 5 hours;
6) Raise the temperature from 370° C. to about 800° C. at a rate of less than 5° C./min;
7) Maintain that temperature for about 6 hours;
8) Cool to ambient temperature.

While the illustrative Examples have employed PAN powder, the process of the present invention also works equally well for PAN fibers and for many battery applications PAN fibers are the preferred form for the carbon electrode material.

From the foregoing description and examples, one skilled in the art can readily ascertain the essential characteristics of the present invention. The description and examples are intended to be illustrative of the present invention and are not to be construed as limitations or restrictions thereon, the invention being delineated in the following claims.

We claim:

1. A method of producing carbon materials for use as electrodes in rechargeable batteries, comprising the steps of:
   a) heating a carbonizable polymer material selected from the group consisting of polyacrylonitrile, co-polymers of polyacrylonitrile and mixtures thereof in a step-wise manner at a fixed rate of heating to a temperature in an inert atmosphere while simultaneously agitating the polymer material to form a pretreated product;
   b) cooling the pretreated product;
   c) heating the pretreated product in an oxygen containing atmosphere in a step-wise manner at a fixed rate of heating to a temperature while simultaneously agitating the pretreated product to form a stabilized polymer product;

d) carbonizing the stabilized polymer product by heating in a step-wise manner to a temperature in an inert atmosphere, thereby forming a carbon material having a surface area of less than 10 $m^2/g$ wherein the step-wise heating comprises:
   i. heating the stabilized polymer product in an inert atmosphere to about 300° C. at a rate of less than 5° C./min;
   ii. maintaining the temperature at about 300° C. for about 2 hours;
   iii. raising the temperature to about 370° C. at a rate of less than 5° C./min;
   iv. maintaining the temperature at about 370° C. for about 5 hours;
   v. raising the temperature from about 370° C. to at least 800° C. at a rate less than 5° C./min;
   and vi. maintaining the temperature at least 800° C. for about 6 hours.

2. The method of claim 1, wherein co-polymers of (PAN) are selected from the group consisting of itaconic acid, acrylic acid, methacrylic acid, vinyl acetate, styrene, divinyl benzene, vinyl chloride and vinylidene chloride and combinations thereof.

3. The method of claim 1, further including the step of adding a pore former material consisting of area.

4. The method of claim 1 wherein said step of carbonizing produces a powder having a symmetric branched morphology with randomly oriented domains shown by transmission electron microscopy to contain approximately 4 to 10 lattice planes extending approximately 20 to 50 Å in the lateral dimension, $d_{002}$ lattice spacing on the order of 3.5 to 3.7 Å, a Raman spectrum showing peaks of near equal height at 1360 $cm^{-1}$ and 1580 $cm^{-1}$, and a BET surface area of less than about 10 $m^2/g$ and an average particle size of less than 35 μm.

5. A method for producing carbon materials capable of intercalating lithium for lithium ion rechargeable batteries, comprising the steps of:
   a) heating and agitating a carbonizable polymer in an inert atmosphere with a pore forming material consisting of urea to form a pretreated product, wherein the carbonizable polymer is selected from the group consisting of homopolymers and co-polymers of polyacrylonitrile, and mixtures and blends thereof;
   b) heating and agitating the pretreated product in an oxygen-containing atmosphere to form a stabilized polymer product; and
   c) carbonizing the stabilized polymer product in an inert atmosphere to form a carbon material having BET surface area of less than 10$m^2/g$ and capable of intercalating lithium for lithium ion rechargeable batteries.

6. The method according to claim 5, wherein the carbonizable polymer is a copolymer of polyacrylonitrile formed by copolymerizing acrylonitrile and at least one monomer selected from the group consisting of itaconic acid, acrylic acid, methacrylic acid, vinyl acetate, styrene, divinyl benzene, vinyl chloride, and vinylidene chloride.

7. The method according to claim 5, wherein step (a) and step (b) further comprise heating in a step-wise manner.

8. The method according to claim 7, wherein step (a) further comprises:
   a) heating the carbonizable polymer to a first temperature of about 175° C. at a first rate of less than 100° C./hr; and
   b) heating the carbonizable polymer to a second temperature of about 250° C. at a second rate of less than 5° C./hr and maintaining the product at 250° C. for about 6 hours.

9. The method of claim 7, wherein step (b) further comprises:
   a) heating the pretreated product to about 100° C. at a rate of less than 100° C./hr; and
   b) further heating the pretreated product to a temperature of about 250° C. at a rate of less than 10° C./min and maintaining the pretreated product at about 250° C. for about 6 hours.

10. The method of claim 5, wherein step (c) further comprises:
   d) heating the stabilized polymer product to a temperature of about 300° C. at a rate of less than about 5° C./min and maintaining it at 300° C. for about 2 hours;
   e) further heating the stabilized polymer product to a temperature of about 370° C. at a rate of less than about 5° C./min and maintaining it at 370° C. for 5 hours; and
   f) further heating the stabilized polymer product to a temperature of at least 800° C., and maintaining it at that temperature for about 6 hours to produce a carbon material capable of intercalating lithium for lithium ion rechargeable batteries.

11. A method for producing carbon materials capable of intercalating lithium for lithium-ion rechargeable batteries, consisting essentially of the steps of:
   a) heating and agitating a carbonizable polymer with a pore forming material consisting of urea in an inert atmosphere to form a pretreated product;
   b) heating and agitating the pretreated product in an oxygen-containing atmosphere to form a stabilized polymer product; and
   c) carbonizing the stabilized polymer product in an inert atmosphere to form a carbon material capable of intercalating lithium for use in lithium ion rechargeable batteries.

12. The method according to claim 11, wherein the carbon material is capable of a lithium intercalation capacity of at least 50% $LiC_6$ after intercalation with lithium.

13. A carbon powder material capable of intercalating lithium for use in lithium ion rechargeable batteries and having a symmetric branched morphology having randomly oriented domains shown by transmission electron microscopy to contain approximately 4 to 10 lattice planes extending approximately 20 to 50 Å in the lateral dimension, $d_{002}$ lattice spacing of about 3.5 to 3.7 Å, a Raman spectrum showing peaks of near equal height at 1360 cm–1 and 1580 cm–1, a BET surface area of less than 10 $m^2/g$ an average particle size of less than 35 μm and a lithium intercalation capacity of at least 50% $LiC_6$ after intercalation with lithium.

14. The carbon material according to claim 13, wherein the material has a lithium intercalation capacity of at least 80% $LiC_6$ after intercalation with lithium.

15. The carbon material according to claim 13, wherein the material is formed by a method comprising heating and agitating a carbonizable polymer in an inert atmosphere with a pore forming material to form a pretreated product, heating and agitating the pretreated product in an oxygen-containing atmosphere to form a stabilized polymer product, and carbonizing the stabilized polymer product in an inert atmosphere.

16. A method for producing carbon materials capable of intercalating lithium for use in lithium ion rechargeable batteries, comprising the steps of:

a) heating and agitating a carbonizable polymer in a step-wise manner in an inert atmosphere to form a pretreated product, wherein the carbonizable polymer is in powder form and selected from the group consisting of homopolymers and co-polymers of polyacrylonitrile, and mixtures and blends thereof;

b) heating and agitating the pretreated product in a step-wise manner in an oxygen containing atmosphere to form a stabilized polymer product; and c) carbonizing the stabilized polymer product in an inert atmosphere with a pore forming material to form a carbon material capable of intercalating lithium for use in lithium ion rechargeable batteries and having a BET surface area of less than 10 $m^2/g$.

* * * * *